United States Patent
Blunt et al.

(10) Patent No.: US 7,535,412 B1
(45) Date of Patent: May 19, 2009

(54) SINGLE PULSE IMAGING RADAR SYSTEM AND METHOD

(75) Inventors: Shannon D Blunt, Shawnee, KS (US); Aaron K Shackelford, South Riding, VA (US); Karl R Gerlach, Chesapeake Beach, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/626,935

(22) Filed: Jan. 25, 2007

(51) Int. Cl.
*G01S 13/89* (2006.01)
*G01S 13/90* (2006.01)
*G01S 13/00* (2006.01)
*G01S 13/28* (2006.01)

(52) U.S. Cl. .............. 342/179; 342/25 R; 342/25 A; 342/25 F; 342/89; 342/94; 342/175; 342/176; 342/195

(58) Field of Classification Search ...... 342/25 R–25 F, 342/118, 134–144, 175, 176, 179, 190–197, 342/22, 59, 82–103, 159, 200–205; 73/570, 73/584, 596, 618, 620, 625, 627, 628
See application file for complete search history.

(56) References Cited

U.S. PATENT DOCUMENTS

| | | | | |
|---|---|---|---|---|
| 4,706,499 A | * | 11/1987 | Anderson | 73/625 |
| 5,134,884 A | * | 8/1992 | Anderson | 73/625 |
| 5,952,955 A | * | 9/1999 | Kennedy et al. | 342/25 F |
| 6,087,981 A | * | 7/2000 | Normant et al. | 342/134 |
| 6,100,839 A | * | 8/2000 | Heger et al. | 342/22 |
| 6,940,450 B2 | | 9/2005 | Blunt et al. | |
| 7,106,250 B2 | * | 9/2006 | Blunt et al. | 342/195 |
| 7,474,257 B2 | * | 1/2009 | Blunt et al. | 342/159 |
| 2005/0046612 A1 | * | 3/2005 | Blunt et al. | 342/195 |
| 2005/0057392 A1 | * | 3/2005 | Blunt et al. | 342/25 F |
| 2006/0097909 A1 | | 5/2006 | Blunt et al. | |

OTHER PUBLICATIONS

J. S. Son et al., Range-Doppler Radar Imaging and Motion Compensation, Ch. 2, "ISAR Concepts", pp. 9-19, Artech House (2001).
V. C. Chen and S. Qian, "Joint time-frequency transform for radar range-Doppler imaging," IEEE Trans, on Aerospace and Electronic Systems, vol. 34, No. 2. pp. 486-499 (Apr. 1998).
M. I. Skolnik, Introduction to Radar Systems, pp. 369-376,420-434, McGraw-Hill (1980).

* cited by examiner

*Primary Examiner*—Bernarr E Gregory
(74) *Attorney, Agent, or Firm*—John J. Karasek; L. George Legg

(57) ABSTRACT

A single pulse imaging (SPI) radar system for creating a radar image from a plurality of Doppler phase-shifted return radar signals in a radar environment of moving targets includes a transmitter; a receiver for receiving a radar return signal; an analog-to-digital converter (ADC) coupled to the output of the receiver; a processor, coupled to the output of the ADC, that is programmed with an SPI algorithm that includes a bank of range/Doppler-dependent adaptive RMMSE-based filters; and a target detector. The algorithm estimates adaptively a range profile for each of the Doppler phase-shifted return radar signals to create the radar image of the moving targets.

15 Claims, 4 Drawing Sheets

SINGLE PULSE IMAGING RADAR SYSTEM AND METHOD

FIELD OF THE INVENTION

The invention relates to radar signal processing. More particularly, the invention relates to a single pulse imaging (SPI) radar method and system.

BACKGROUND OF THE INVENTION

Radar imaging techniques, such as inverse synthetic aperture radar (ISAR), rely on measuring the Doppler shifts induced by relative motion between the target and the radar to generate an image of the target. High range resolution is achieved using pulse compression techniques, whereas high cross-range resolution relies on the accurate measurement of the Doppler shifts induced by uniform rotational motion of the target. In traditional ISAR processing, numerous pulses over a period of time must be processed using Fourier processing to measure the Doppler frequency of the moving target. If target scatterers move out of their range cells during the imaging time, or if the rotational motion is not uniform, the image will be smeared. Therefore, motion compensation algorithms must be used to produce a focused ISAR image.

Pulse compression allows a radar to obtain the range resolution of a short pulse without the need for very high peak transmit power by transmitting a long pulse that is phase or frequency modulated. The modulated pulse or waveform, is reflected back to the radar by scatterers that lie in the transmission path. This process can be viewed as the convolution of the transmitted waveform with an impulse response that is representative of the range profile illuminated by the radar. The purpose of pulse compression is then to estimate the range profile impulse response based upon the known transmitted waveform and the received radar return signal. The traditional method of pulse compression, known as matched filtering, has been shown to maximize the received signal-to-noise ratio (SNR), of the target return. A matched filter is applied by convolving the received signal with the time-reversed complex conjugate of the transmitted waveform. The traditional matched filter is limited by the range sidelobes produced by the filtering process. The sidelobes of large targets can mask the presence of nearby small targets, thus limiting the sensitivity of the radar.

Adaptive pulse compression (APC) by way of Reiterative Minimum Mean-Square Error (RMMSE), described in U.S. Pat. No. 6,940,450, issued Sep. 6, 2005 and incorporated herein by reference, is capable of accurately estimating the range profile illuminated by a radar by suppressing range sidelobes to the level of the noise floor. This is accomplished by adaptively estimating the appropriate receiver pulse compression filter to use for each individual range cell. Furthermore, the RMMSE algorithm, which has also been denoted as Adaptive Pulse Compression (APC) when applied to the radar pulse compression problem, has been shown to be robust to rather severe Doppler mismatch. A multistatic adaptive pulse compression (MAPC) formulation that can resolve a radar target in the presence of multiple radar return signals occupying a shared frequency spectrum is described in U.S. Ser. No. 11/268,755, filed Nov. 7, 2005 now U.S. Pat. No. 7,474,257, incorporated herein by reference (hereinafter "MAPC").

It would be desirable to provide an adaptive radar processing system that can resolve a moving radar target image from a single transmitted pulse using a Doppler-sensitive variation of the multistatic adaptive pulse compression formulation thereby mitigating the need for motion compensation.

BRIEF SUMMARY OF THE INVENTION

According to the invention, a single pulse imaging (SPI) radar system for creating a radar image from a plurality of Doppler phase-shifted return radar signals in a radar environment of moving targets includes a transmitter; a receiver for receiving a radar return signal; an analog-to-digital converter (ADC) coupled to the output of the receiver; a processor, coupled to the output of the ADC, that is programmed with an SPI algorithm that includes a bank of range/Doppler-dependent adaptive RMMSE-based filters; and a target detector. The algorithm estimates adaptively a range profile for each of the Doppler phase-shifted return radar signals to create the radar image of the moving targets.

Also according to the invention, a method for radar imaging using a single transmitted radar pulse includes transmitting a single radar pulse towards the moving targets; receiving a plurality of return reflected radar signals; and applying the SPI algorithm to the return signals to create the radar image of the moving targets.

DETAILED DESCRIPTION OF THE INVENTION

Figure 1:
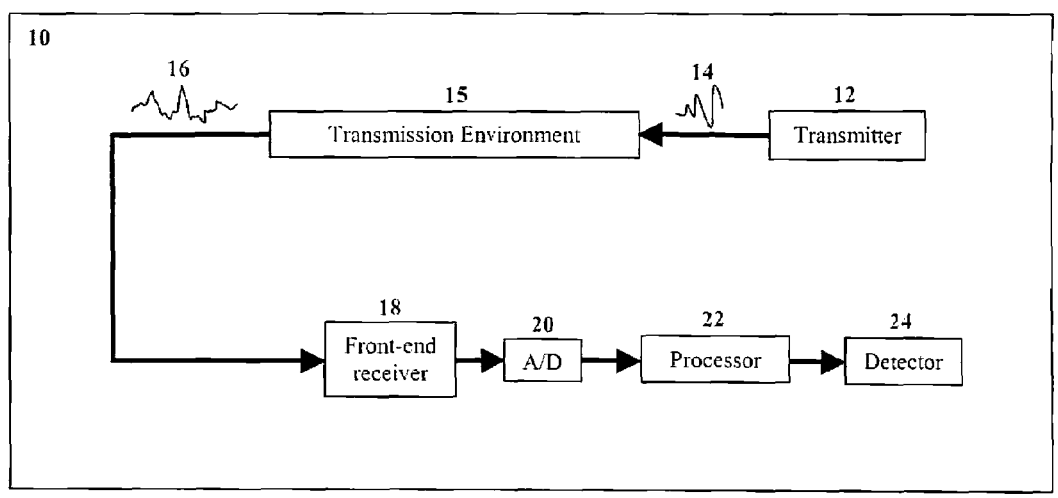
FIG. 1 is a schematic diagram of a Single Pulse Imaging (SPI) radar system according to the invention.

Referring now to FIG. 1, a single pulse imaging (SPI) radar system 10 includes a transmitter 12 for transmitting a modulated pulse (or waveform) 14, that upon interacting with its transmission environment's unknown impulse response 15 (to be imaged, as is described further below) forms a signal 16 that is a convolution of waveform 14 and impulse response 15, an analog front-end receiver 18 for receiving signal 16, an optional analog-to-digital (A/D) converter 20, a processor 22 having a computer readable storage medium, such as a hard drive, RAM, or the like, for processing analog or digital signal 16, and a detector 24. The processor 22 includes a single pulse imaging (SPI) algorithm, applied monostatically, described as follows.

Consider first a simplistic scenario whereby all of the scatterers are moving at the same velocity, v, relative to the radar platform. The motion relative to the radar platform induces a Doppler phase shift, $\theta$, in the received signal for each scatterer. Let the length-N vector s denote the discrete-time version of the transmitted waveform. The length-N vector $x(\lambda, \theta) = [x(\lambda,\theta) x(\lambda-1.\theta) \ldots x(\lambda-N+1.\theta)]$ represents a set of N contiguous samples of the range profile impulse response. Note that the range profile is a function of $\theta$, highlighting the fact that all of the scatterers in the range profile are moving at the same relative velocity and therefore induce the same Doppler phase shift $\theta$ in the radar return signal. The $\lambda^{th}$ sample of the received radar return is defined as $$y(\lambda,\theta)=(x(\lambda,\theta)\circ e(\theta))^T s+v(\lambda). \qquad (1)$$

for $\lambda=0,\ldots,L+N-2$, where $v(\lambda)$ is additive noise. $(\square)^T$ is the transpose operation, L is the total number of contiguous range gates desired to be estimated (i.e. the processing window), and ○ indicates the Hadarmard product (element-by-element multiplication). The N-dimensional vector $e(\theta)=[1 e^{j\theta} e^{j2\theta} \ldots e^{j(N-1)\theta}]^T$ represents the relative phase shifts of the N contiguous samples of $x(\lambda,\theta)$ where $\theta$ is the Doppler phase shift between successive received samples.

Although the received radar return model of (1) is for scatterers moving at the same relative velocity, the model can easily be generalized to include scatterers moving at different velocities by integrating (1) over every possible Doppler phase shift (note that integration here represents the inclusion of received signal components over all values of $\theta$ and hence is not performed on the noise term). The $\lambda^{th}$ sample of the total received signal is then $$y(l) = \int_{-\pi}^{\pi} (x(l,\theta) \circ e(\theta))^T s\, d\theta + v(l). \quad (2)$$

Although (2) is continuous in $\theta$, it can be approximated by $$y(l) = \sum_{k=1}^{K} (x(l,\theta_k) \circ e(\theta_k))^T s + v(l), \quad (3)$$

where $$\theta_k = -\pi + \frac{2\pi}{K-1}(k-1),\ k=1\ \ldots\ ,K, \quad (4)$$

and K is arbitrarily large, such that (3) is a good approximation of (2). For notational simplicity, we denote $x(\lambda,\theta_k) \square x_k(\lambda)$. By rearranging terms, (3) can be expressed as $$y(l) = \sum_{k=1}^{K} x_k^T(l)\tilde{s}_k + v(l). \quad (5)$$

where $$\tilde{s}_k = s \circ e(\theta_k) \quad (6)$$

is a Doppler phase shifted version of the transmitted waveform. The collection of N contiguous samples of the received return signal $y(\lambda)=[y(\lambda)y(\lambda+1)\ldots y(\lambda+N-1)]^T$ can therefore be expressed as $$y(l) = \sum_{k=1}^{K} A_k^T(l)\tilde{s}_k + v(l), \quad (7)$$

where $$A_k(l) = [x_k(l)x_k(l+1)\ldots x_k(l+N-1)] = \quad (8)$$

$$\begin{bmatrix} x_k(l) & x_k(l+1) & \ldots & x_k(l+N-1) \\ x_k(l-1) & x_k(l) & & x_k(l+N-2) \\ \vdots & \vdots & \ddots & \vdots \\ x_k(l-N+1) & x_k(l-N+2) & \ldots & x_k(l) \end{bmatrix}.$$

As shown by (7), the radar return can be viewed as the summation of the returns from K distinct range profiles, each illuminated by a unique waveform. The monostatic formulation given above is mathematically identical to the MAPC formulation. Hence, using the MAPC formulation and solution, the SPI algorithm is above to accurately estimate each of the "range profiles", thereby producing an estimate of the two-dimensional range-Doppler profile. By measuring both range and Doppler information of multiple targets using a single pulse, it is possible to produce focused radar images without the use of complicated motion compensation techniques. Note, however, that the Doppler resolution is limited by the length of the pulse and therefore SPI is intended for fast-moving targets such as aircraft or missiles, e.g. for targets moving at speeds above Mach 2 for a W-band radar.

Figure 2:
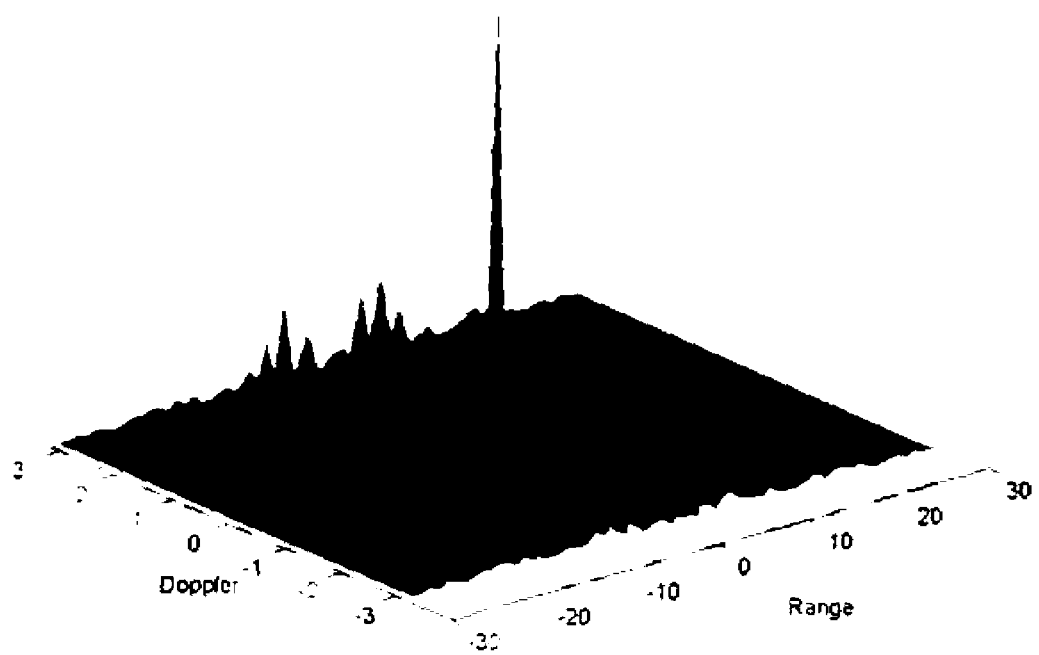
FIG. 2 is a graph showing a transmitted waveform according to the invention.

The initial processing stage for the SPI algorithm consists of a bank of Doppler phase-shifted versions of the standard matched filter. The phase shifted versions of the matched filter partitions the Doppler space such that regardless of the Doppler shift induced by target motion, the radar return will match closely to at least one of the waveforms in the receiver. In order to facilitate the greatest Doppler resolution, a waveform with a thumbtack type ambiguity function is used for the transmitted waveform. A thumbtack ambiguity diagram is shown in FIG. 2 for a length N=30 random phase waveform. Because the ambiguity peak is narrow in both range and Doppler, the range/Doppler "location" of a given target can be more accurately known than would be possible for a Doppler-tolerant waveform.

Were one to use standard matched filtering alone, the range profile for the $k^{th}$ Doppler shift could be estimated as $$\hat{x}_{MF,k}(\lambda) = \tilde{s}_k^H y(\lambda). \quad (9)$$

where $(\square)^H$ is the Hermitian operation (note that this is also the first stage of the SPI algorithm). In addition to the problems due to high range sidelobes, the matched filters are unable to accurately distinguish between targets based on their Doppler shifts, as will be shown below. To overcome the issues associated with traditional matched filtering, in subsequent stages of the SPI algorithm the bank of matched filters, $s_k$ in (9), is replaced by a bank of range/Doppler-dependent adaptive RMMSE-based filters. To produce an estimate of the received range profile associated with Doppler, an MMSE cost function is minimized for each range/Doppler cell as $$J_k(\lambda) = E[|x_k(\lambda) - w_k^H(\lambda) y(\lambda)|^2]. \quad (10)$$

where $w_k(\lambda)$ is the APC weight vector for the $\lambda^{th}$ range cell in the range profile with Doppler phase shift $\theta_k$, and $E[\square]$ is the expectation operator. The solution to (10) takes the form $$w_k(l) = \hat{\rho}_k(l) \left( \sum_{i=1}^{K} C_i(l) + R \right)^{-1} \tilde{s}_k, \quad (11)$$

where $\hat{\rho}_k(\lambda) = |\hat{x}_k(\lambda)|^2$ is the estimated power of $x_k(\lambda)$, $R=E[v(\lambda)v(\lambda)^H]$ is the noise covariance matrix, and the matrix $$C_i(l) = \sum_{n=-N+1}^{N-1} \hat{\rho}_k(l+n)\bar{s}_{i,n}\bar{s}_{i,n}^H \quad (12)$$

where $\bar{s}_{i,n}$ contains the elements of the Doppler phase shifted waveform $\tilde{s}_i$ shifted by n samples and zero-filled in the remaining n samples, e.g., $\tilde{s}_{i,2}=[0\ 0\ \tilde{s}_i(0)\ \ldots\ \tilde{s}_i(N-3)]^T$ and $\tilde{s}_{i,-2}=[\tilde{s}_i(2)\ \ldots\ \tilde{s}_i(N-1)\ 0\ 0]^T$. The APC filters of (11), although similar to the multistatic MAPC filter, are applied monostatically in order to produce a two-dimensional range-Doppler image.

Estimates of the K Doppler-shifted range profiles, as well as knowledge of the noise covariance matrix R are required to form the APC weight vectors. Assuming the noise covariance is white Gaussian, R simplifies to $\sigma_v^2 I_N$, where $\sigma_v^2$ is the noise power, and $I_N$ is the N×N identity matrix.

Initially, as no knowledge of the K range profiles is available, the estimated power can be set to unity, $\hat{\rho}_k(\lambda)=1$, $\forall k, \lambda$, and the noise assumed to be negligible. Thus (11) and (12) reduce to $$w_k(l) = \left(\sum_{i=1}^{K} \tilde{C}_i\right)^{-1} \tilde{s}_k \quad (13)$$

$$\tilde{C}_i = \sum_{n=-N+1}^{N-1} \tilde{s}_{i,n} s\, \tilde{s}_{i,n}^H. \quad (14)$$

The filters of (13) are applied as in (9) with $\tilde{s}_k$ replaced by $\bar{w}_k(\lambda)$ and the initial K range profile estimates obtained. The range profile estimates are then used to calculate (11) which is subsequently re-applied to the received data. This reiterative procedure is applied for a predetermined number of stages, with each stage improving the estimation accuracy. It has been found via simulation that good sidelobe suppression may be obtained using between 4 and 6 stages of reiteration. The structure of the APC filters enables fast implementation via the matrix inversion lemma through a direct extension of the approach utilized in [6]. The fast implementation eliminates the need to compute a new matrix inverse in (11) for each successive range index $\lambda$. We can write $$\sum_{i=1}^{K} C_i(l) + R$$

from (11) in the following form $$\sum_{i=1}^{K} C_i(l) + R = \begin{bmatrix} a & d^H \\ d & Q \end{bmatrix} \quad (15)$$

where $a$ is a scalar, $d$ is (N−1)×1, and Q is (N−1)×(N−1). From (12), the next contiguous range cell, the matrix $$\sum_{i=1}^{K} C_i(l+1) + R$$

can be written as $$\sum_{i=1}^{K} C_i(l+1) + R = \begin{bmatrix} Q & g \\ g^H & b \end{bmatrix} \quad (16)$$

where b is a scalar, g is (N−1)×1, and Q is the same matrix from (15). The similarity between (15) and (16) can be exploited as follows using the matrix inversion lemma. First, we apply the permutation matrix $$P = \begin{bmatrix} 0_{N-1}^T & 1 \\ I_{N-1} & 0_{N-1} \end{bmatrix} \quad (17)$$

in which $I_{N-1}$ is the (N−1)×(N−1) identity matrix and $0_{N-1}$ is an (N−1)×1 vector of zeros, to obtain $$D = P^T\left(\sum_{i=1}^{K} C_i(l) + R\right)P = \begin{bmatrix} Q & d \\ d^H & b \end{bmatrix}. \quad (18)$$

If we define $\tilde{d}^T=[d^T\ 0]^T$ and $\tilde{g}^T=[g^T\ 0]^T$, the matrix $$\sum_{i=1}^{K} C_i(l+1) + R$$

can be written as $$\sum_{i=1}^{K} C_i(l+1) + R = D + (\tilde{g}-\tilde{d})e_N^T + e_N(\tilde{g}-\tilde{d}) + (b-a)e_N e_N^T \quad (19)$$

where $e_N=[0\ \ldots\ 0\ 1]^T$ has length N. Given (19), it is straightforward to show using the matrix inversion lemma that $$\left(\sum_{i=1}^{K} C_i(l+1) + R\right)^{-1} = D^{-1} - D^{-1}U(\Gamma^{-1} + V^H D^{-1} U)^{-1} V^H D^{-1} \quad (20)$$

in which $\Gamma=\text{diag}\{1.1.(b-a)\}$, $U=[(\tilde{g}-\tilde{d})\ e_N e_N]$, and $V=[e_N\ (\tilde{g}-\tilde{d})\ e_N]$. Hence, given $$\left(\sum_{i=1}^{K} C_i(l) + R\right)^{-1}$$

computed at a given range cell.

$$\left(\sum_{i=1}^{K} C_i(l+1) + R\right)^{-1}$$

for the next range cell can be efficiently determined without the need to re-compute the matrix inverse.

To discuss Doppler resolution we first introduce the term $\phi$ which represents the total Doppler phase shift over the length of the waveform (as opposed to the phase shift between successive received samples previously specified as $\theta$). In terms of the bank of Doppler-shifted matched filters, it has been observed that two targets of equal power can be resolved on the basis of a single pulse when the phase difference over the length of the waveform (i.e. $\Delta\phi$) between the two targets is $2\pi$ radians. In contrast, the Doppler resolution of the SPI algorithm under the same conditions has been found to be only $\pi$ radians. Thus, SPI effectively achieves Doppler super-resolution that is a two-fold improvement over the nominal matched filter Doppler resolution. However, the trade-off for achieving this super-resolution as well as the suppression of range and Doppler sidelobes is that the approximation in (24) requires K to be sufficiently large to accurately represent all possible Doppler shifts present. Experimentation via simulation has shown that specifying the set of Doppler-shifted waveforms such that $$\Delta\phi \leq \frac{\pi}{5}$$

between contiguous Doppler-shifted version of the transmit waveform provides sufficiently high representation in the Doppler domain. The need for Doppler over-sampling is a result of Doppler mismatch effects which, as discussed previously, fundamentally limit the suppression of sidelobes. Note, though, that large values of $\Delta\phi$ need not be included (relative to the particular application) as these may represent Doppler shifts which would not be expected to occur in practice.

Waveforms that produce "thumbtack" ambiguity function (see FIG. 2) are well suited to the SPI algorithm in that they provide relatively low range sidelobes as well as low Doppler sidelobes. By comparison, Doppler-tolerant waveforms typically enable lower range sidelobes but do so at the cost of very high Doppler sidelobes. While high Doppler sidelobes can be desirable to maintain high probability of detection for applications when only one receive filter is employed, for this type of imaging they have the adverse effect of causing large scatterers to smear across Doppler in the image.

The single pulse imaging (SPI) algorithm simultaneously measures the Doppler phase shifts of multiple moving targets while adaptively pulse compressing a received radar waveform on a single pulse basis. Multiple pulse imaging algorithms have problems accounting for scatterers moving out of their range cells during the imaging time, resulting in a smeared image. Because both range and Doppler measurements are made using only a single pulse, the need for complicated motion compensation algorithms to correct for blurring due to range migration and/or non-uniform rotation is mitigated. In addition, SPI has the ability to image very high speed targets. Unlike the MAPC algorithm referred to above SPI is applied monostatically, where Doppler-induced phase-shifted versions of the transmitted waveform are modeled as independent received waveforms. A unique range profile is estimated for each Doppler phase shift, resulting in a two-dimensional range-Doppler image. The use of APC techniques allow small scatterers to be identified, which would otherwise be masked by the sidelobes of nearby larger scatterers.

Figure 3:
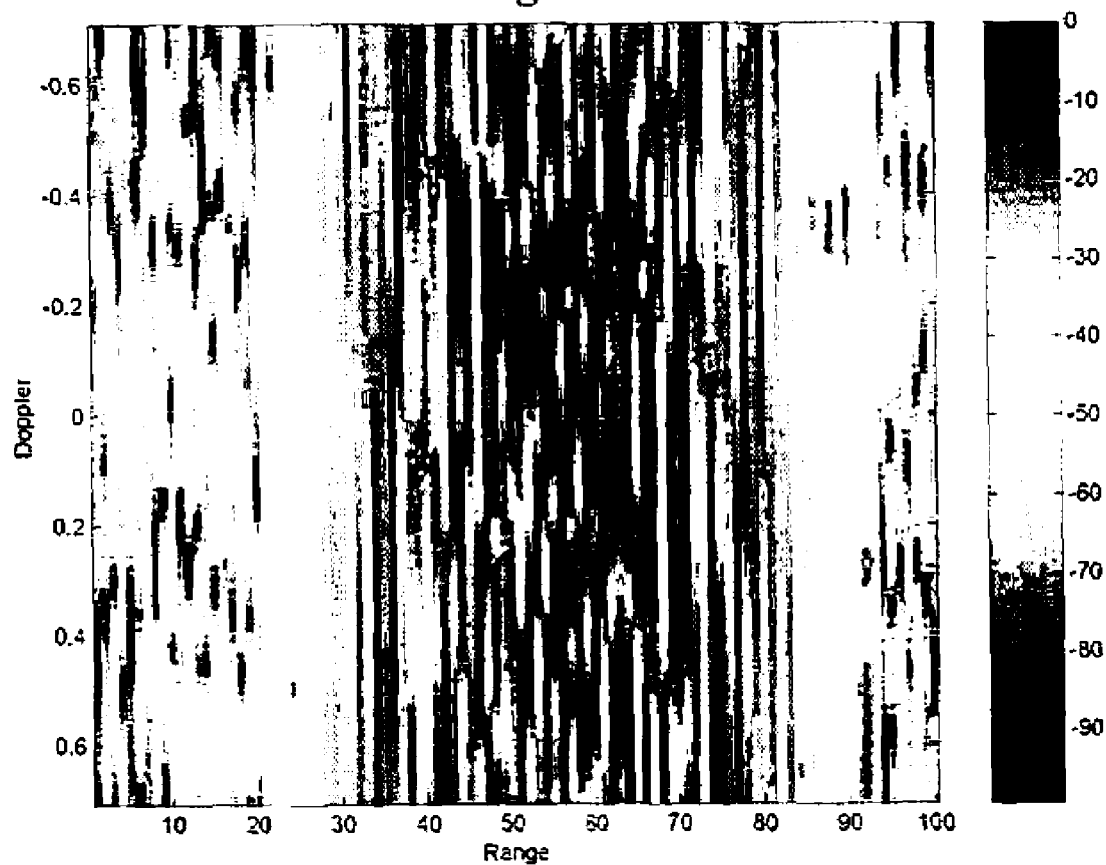
FIG. 3 is a graph showing a range-Doppler output for a bank of matched filters.
Figure 4:
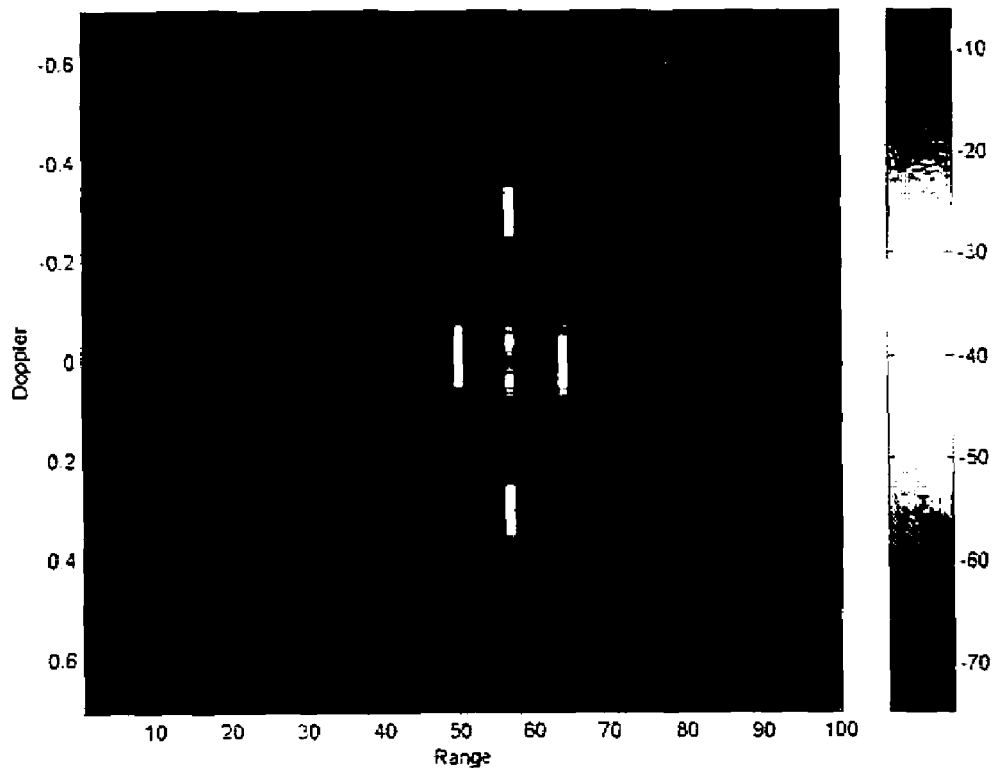
FIG. 4 is a graph showing a range-Doppler output for SPI according to the invention.

As an example, consider a simulated target scenario consisting of a large stationary scatterer surrounded by four smaller scatterers. Two of the smaller scatterers are stationary, located 7 range cells before and after the large scatterer. The other two small scatterers are in the same range cell as the large scatterer, but possess Doppler phase shifts over the length of the waveform of $\phi=\pm 2.75\pi$ (analogous to a Mach 2 scatterer illuminated by a 3.5-µs pulse at W-band). The transmitted waveform is a length N=30 random phase waveform. The signal-to-noise ratio (SNR) of the large target is 60 dB, and the small targets are 20 dB lower than the large target. The Doppler shifts of the smaller targets are analogous to Mach 2 targets illuminated by a 3.5 µs pulse at W-band. The output of a bank of matched filters is shown in FIG. 3. The only identifiable scatterer when matched filters are utilized is the large stationary scatterer, all other scatterers are masked by its range and Doppler sidelobes. The output of the SPI algorithm applied to this target scenario is shown in FIG. 4. All five scatterers are easily identifiable in the SPI image.

Obviously many modifications and variations of the present invention are possible in the light of the above teachings. It is therefore to be understood that the scope of the invention should be determined by referring to the following appended claims.

What is claimed as new and desired to be protected by Letters Patent of the United States is:

1. A method for radar imaging using a single transmitted radar pulse, comprising:
   a) transmitting a single radar pulse toward a plurality of moving targets;
   b) receiving a plurality of return reflected radar signals; and
   c) estimating adaptively a range-Doppler profile for each of the plurality of return reflected radar signals to thereby produce a radar image of the plurality of moving targets from said estimated range-Doppler profiles, and
   wherein steps a)-c) are conducted in a single operational radar pulse cycle.

2. A method as in claim 1, wherein the estimating adaptively is performed with reiterative minimum mean-square error (RMMSE) estimation.

3. A method as in claim 2, wherein a cost function $J_k(\lambda)=E[|x_k(\lambda)-w_k^H(\lambda)y(\lambda)|^2]$ is minimized for each range profile, where $w_k(\lambda)$ is the APC weight vector for the $\lambda^{th}$ range cell in the range profile with Doppler phase shift $\theta_k$, and $E[\Box]$ is the expectation operator.

4. A method as in claim 1, wherein the single transmitted radar pulse waveform has a thumbtack type ambiguity function.

5. A single pulse imaging (SPI) radar system for obtaining from a single transmitted radar pulse a radar image of a plurality of moving targets from a plurality of Doppler phase-shifted return radar signals reflected from the plurality of moving targets, comprising:
   a receiver for receiving a radar return signal;
   a processor coupled to the receiver and programmed with an SPI algorithm that includes a bank of range/Doppler-dependent adaptive RMMSE-based filters for estimating adaptively a range profile for each of the Doppler phase-shifted return radar signals to thereby produce the radar image of the plurality of moving targets from said estimated range-Doppler profiles; and a target detector, and wherein said SPI algorithm obtains said radar image in a single operational radar pulse cycle.

6. A radar system as in claim 5, wherein the estimating adaptively is performed with reiterative minimum mean-square error (RMMSE) estimation.

7. A radar system as in claim 6, wherein a cost function $J_k(\lambda)=E[|x_k(\lambda)-w_k^H(\lambda)y(\lambda)|^2]$ is minimized for each range profile, where $w_k(\lambda)$ is the APC weight vector for the $\lambda^{th}$ range cell in the range profile with Doppler phase shift $\theta_k$, and $E[\square]$ is the expectation operator.

8. A radar system as in claim 5, wherein the single transmitted radar pulse waveform has a thumbtack type ambiguity function.

9. A radar system as in claim 5, further comprising a transmitter configured to periodically transmit a single radar pulse.

10. A radar system as in claim 5, further comprising an analog-to-digital converter (ADC) coupled between the receiver and the processor.

11. A radar system as in claim 10, further comprising a transmitter configured to periodically transmit a single radar pulse.

12. A single pulse imaging (SPI) radar system for obtaining from a single transmitted radar pulse a radar image of a plurality of moving targets from a plurality of Doppler phase-shifted return radar signals reflected from the plurality of moving targets, comprising:

a transmitter;

a receiver for receiving a radar return signal;

an analog-to digital converter (ADC) coupled to the output of the receiver;

a processor coupled to the output of the ADC and programmed with an SPI algorithm that includes a bank of range/Doppler-dependent adaptive RMMSE-based filters for estimating adaptively a range-Doppler profile for each of the Doppler phase-shifted return radar signals to thereby produce the radar image of the plurality of moving targets from said estimated range-Doppler profiles; and a target detector, and wherein said SPI algorithm obtains said radar image in a single operational radar pulse cycle.

13. A radar system as in claim 12, wherein the estimating adaptively is performed with reiterative minimum mean-square error (RMMSE) estimation.

14. A radar system as in claim 13, wherein a cost function $J_k(\lambda)=E[|x_k(\lambda)-w_k^H(\lambda)y(\lambda)|^2]$ is minimized for each range profile, where $w_k(\lambda)$ is the APC weight vector for the $\lambda^{th}$ range cell in the range profile with Doppler phase shift $\theta_k$, and $E[\square]$ is the expectation operator.

15. A radar system as in claim 12, wherein the single transmitted radar pulse waveform has a thumbtack type ambiguity function.

* * * * *